Feb. 3, 1942. H. L. NEWELL 2,271,987
RESISTANCE WELDING APPARATUS
Filed Oct. 8, 1941

Inventor:
Heber L. Newell,
by Harry E. Dunham
His Attorney.

Patented Feb. 3, 1942

2,271,987

UNITED STATES PATENT OFFICE 2,271,987

RESISTANCE WELDING APPARATUS

Heber L. Newell, Bridgeport, Conn., assignor to General Electric Company, a corporation of New York Application October 8, 1941, Serial No. 414,128

6 Claims. (Cl. 219—4)

My invention relates to resistance welding apparatus and more specifically to a device or tool for making welded connections in wiring systems. It is particularly suited for making connections such as are used in dwellings and factories, but of course it is not limited to this particular use.

Although mechanical connections have been used to join the wires of such systems, the more general practice has been to join the wires by means of soldered joints. In making a soldered joint there is always the possibility of including flux in the joint which will increase the resistance of the joint and cause corrosion at the joint. There is also the possibility of not heating the joint and solder to a sufficiently high temperature to produce the desired union between the wires and the solder. Furthermore the soldering operation is time consuming in itself and requires a proper preparation of the ends of the wires by skinning, scraping and thorough cleaning to adapt them for the soldering operation. When the joint is made by an open flame, as is usually the case, the careless application of the flame to the joint often results in burning insulating compound out of the covering on the wires as well as destroying any rubber forming part thereof in the immediate vicinity of the joint. Furthermore, since the soldering temperature is insufficient to melt the sharp edges at the cut ends of the wires being joined, these sharp edges persist in the joint as finished and are liable to cut through insulation applied to the joint after the soldering operation has been finished. The use of an open flame in making such soldered joints also results in a certain fire hazard which it is desirable to eliminate.

It is an object of my invention to provide a tool for making welded connections in wiring systems which avoids the above recited disadvantages of soldered connections.

It is a further object of my invention to provide a tool into which the ends of wires which have not been carefully cleaned of their insulation may be placed to connect them by a welded joint which firmly unites them and completely destroys any sharp edges at their ends.

It is also an object of my invention to provide a tool in which the welding temperature and welding pressure are obtained by pushing the wire ends against the inwardly converging side walls of a recess which is formed partly in each of a plurality of juxtaposed electrically insulated electrodes.

Figure 1:
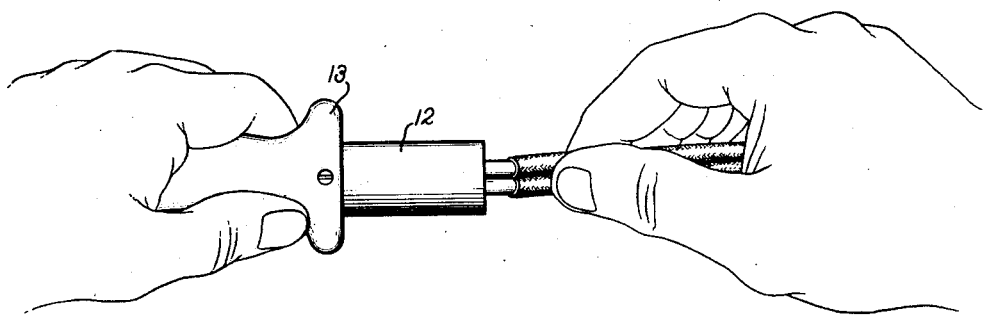
Figure 3:
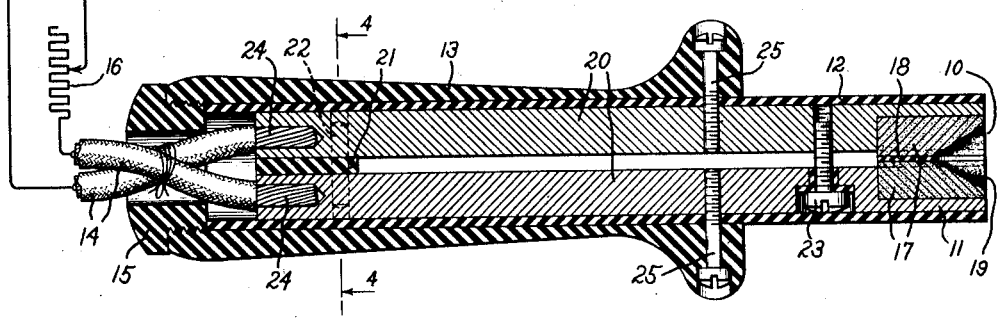
Figure 4:
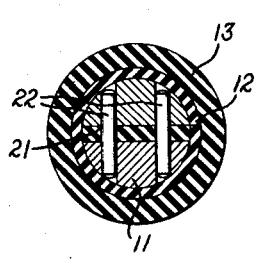
Figure 5:
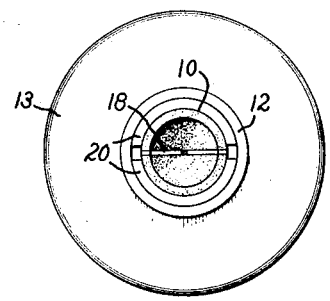
Figure 2:

Further objects of my invention will become apparent from a consideration of the accompanying drawing, Fig. 1 of which shows a hand tool embodying my invention and the method of making a welded joint between a plurality of wires; Fig. 2 of which shows the welded union produced by using my welding tool; Fig. 3 of which is a side sectional view illustrating the characteristic features of my welding tool; Fig. 4 of which is a sectional view of Fig. 3 along lines 4—4 thereof; and Fig. 5 of which is an end view of the welding tip portion of my welding tool.

In accordance with my invention the ends of two or more wires are bared of insulation and then pressed in side-by-side relationship into a recess located in a welding tip forming part of my welding tool. This welding tip is a laminated block formed of layers of electrically conductive high resistance material separated by a layer of electrically nonconductive material and its recess is formed partly in each of the layers of the block. This recess tapers inwardly in all directions from its open end, which is crosswise of these layers in a surface of the block, to its closed end which is located within the block. When the ends of the wires to be joined are pressed into this recess they make contact with and complete an electrical circuit from one conductive layer of the block to the other. Within a short time they become heated and plastic from the heat generated by the flow of welding current so that upon deformation they are united by a welded joint determined by the shape of the recess. The welding tip is supported in a clamp which exposes its recessed portion so that wires may be readily inserted and removed therefrom. Welding current is supplied to the welding tip from a source of supply by conductors connected to the jaws or fingers of the welding clamp. These jaws make a conductive engagement with the conductive layers of the block which act as electrodes.

The hand tool shown in the drawing comprises a welding tip 10 which is located and held in the recessed end of a clamp 11. This clamp is located within a sleeve of insulating material 12 so that only the recessed end of the welding tip is exposed at one end of the sleeve for the insertion and removal of wire assemblies that are to be welded together. A handle 13, preferably made of insulating material, is mounted on the other end of sleeve 12. Welding current is supplied to the welding tip through conductors 14 each of which is connected to a jaw member of the clamp. These conductors extend through an insulating collar 15 which is threaded into the end of handle 13. Conductors 14 form part of a resistance welding circuit including an adjustable resistor 16. They may for example be connected to the secondary of a welding transformer whose primary is connected to a suitable source of alternating current supply. It is of course apparent that conductors 14 may also be connected to a direct current source of supply and that other means than resistor 16 may be used for adjusting the value of welding current supplied to the welding tip.

The welding tip 10 is a cylindrical laminated block formed of layers of electrically conductive material 17 separated by a layer of electrically nonconductive material 18. Its exposed end portion is provided with a conical recess 19 which is formed partly in each of the layers of the block. This recess need not be conical in shape as illustrated, since any recess conoidal or otherwise which tapers inwardly in all directions from its open end which is crosswise of these layers in an outside surface of the block, will prove to be satisfactory. Preferably the inner end of the recess is closed and the surface of the recess is continuous so that wire ends inserted in the recess may be readily twisted or rubbed against its surface to shape the weld between the wires after they have been softened by the heat which is generated for the most part where they contact with the electrically conductive portions or electrodes of the welding tip. These electrodes are preferably formed of a high resistance material such as carbon, silicon-carbide mixture known as Globar, tungsten, molybdenum, iron, stainless steel and the like. The insulating material between these electrodes may be mica, clay, porcelain or some similar material which is not only an electrical insulator, but also resistant to temperatures such as are obtained in making a resistance weld between wires of copper and the like.

The welding tip 10 is inserted and held within two complementary semi-cylindrical openings located in the outer ends of the two semi-cylindrical jaw members 20 of clamp 11. The flat inner ends of these jaw members engage and are spaced from one another by an insulating block 21 provided with two dowel pins 22 which extend into holes in each of the jaw members 20 and hold these jaw members in desired positions relatively to one another. These jaw members are opened and closed by a clamping screw 23 which is insulated from one of the jaw members and engages a threaded opening in the other jaw member. Each of the jaw members is provided with an independent electrical connection 24 with each of the conductors 14 by means of which welding current is supplied to the clamp and welding tip. A plurality of screws 25, having heads recessed within openings in the collar portion of handle 13, extend through this collar and sleeve 12 to make a threaded engagement with jaws 20 of clamp 11. These screws hold the several parts in the assembled relationship shown in the drawing.

My welding tool is small in size and light in weight making it easy to use. As it is only used intermittently, conductors 14 for supplying welding current thereto may be made quite small in size so that their weight is negligible and in no way hinders the operator's use of the welding tool. Since the tool is fully insulated by sleeve 12 forming a part thereof, it may be used in restricted places and laid on metallic surfaces without short circuiting the source of supply or in any way damaging the tool or the objects which it may engage. There is also no possibility of the operator receiving a shock, no matter how carelessly he handles the tool for only by deliberate action on his part is it possible to contact or make contact with the electrodes of the welding tip.

One method of using the tool above described for joining the ends of two solid wires having a coating of insulation thereon is shown in Fig. 1. As shown in this figure the wire ends are bared of insulation and held in one hand so that the bared ends are in side-by-side relationship. They are then pressed firmly into the recess in the open end of the welding tool which is held in the other hand. As soon as the wire ends make engagement with the electrodes of the welding tip current flows from one electrode to the other through the wire ends. Most of the heat resulting from this flow of current is generated in the electrodes and where these wire ends make engagement with the surfaces of the electrodes. Within a short period of time the wire ends are sufficiently heated to become plastic and a firm pressure applied thereto by forcing the wires into the welding tool results in the formation of a weld between the wire ends such as shown in Fig. 2. The weld of course takes the shape of the recess. The formation of this weld may be facilitated by twisting or rubbing the wire ends over the surface of the recess formed partly in each of the electrodes.

There are several advantages resulting from the use of my welding tool. It is only necessary to expose a short length of the wire ends. Furthermore a good weld will be obtained, even though these wire ends are not carefully cleaned so that rubber and insulating material still adhere in minor quantities to their end portions. This is because conductive engagement is initially made between the wire ends and the welding tip through the cut ends of the wire. Another advantage is that the tool may be intermittently used without annoying delays since it is not necessary to have any part of it come up to temperature before it is capable of being used.

There are also the following advantages. The welded joint obtained by using my tool is much better mechanically than the usual soldered joint since there is much less chance for obtaining a poor weld than there is of obtaining a poor or cold soldered joint. The welded joint is also better electrically because there is no possibility of including flux in the joint and because there is a continuous uniform path through the joint instead of a high resistance solder path. Furthermore there are no sharp points on the joint so that insulation may be applied thereto without having the joint break through the insulation due to sharp points such as result from cutting the wires. In making a soldered joint these sharp points are not destroyed, whereas in making a welded joint with my tool these sharp edges enter into and become part of the weld and disappear into the smooth surface of the weld formed thereby. Since the welded joint is quickly made when using a tool of my construction very little heat extends back into the insulated portion of the wires. There is consequently no destruction or burning of the insulation near the joint such as frequently occurs when using the open flame of a torch.

A tool embodying my invention may be used for joining more than two wires and the wires may be solid or stranded or both. In making a joint it is not necessary to hold the tool as shown in the drawing since any convenient and comfortable positioning of it relatively to the wire ends is possible. If there is any possibility of the wire ends melting, the tool may be held in a vertical position so that molten metal will not run out of the recess in its welding tip. Any molten metal formed will usually adhere to the weld and quickly solidify as soon as the wire ends are withdrawn from the welding tip.

It is apparent that the welding tip may be provided with more than two electrodes and that these electrodes may be connected in various ways to a source of direct current or a single or polyphase source of alternating current. It is also apparent that my invention may be used other than as a hand tool. It may, for example, be embodied in a manually operated or automatic machine. Consequently my invention is not limited in its application to welding tools having the specific details of construction above described and illustrated in connection with one embodiment thereof. Many variations and modifications thereof will occur to those skilled in the art and I consequently intend in the appended claims to cover all such modifications and variations.

What I claim as new and desire to secure by Letters Patent of the United States is:

1. Resistance welding apparatus comprising a laminated block formed of layers of electrically conductive material separated by a layer of electrically nonconductive material and having a recess therein which is formed partly in each of said layers of said block and tapers inwardly in all directions from its open end which is crosswise of said layers in a surface of said block, a holder which supports said laminated block so that work parts may be readily inserted and removed from said recess located therein, and independent electrical connections for each of said electrically conductive layers of said block.

2. Resistance welding apparatus comprising a laminated block formed of layers of electrically conductive high resistance material separated by a layer of electrically nonconductive material and having a recess therein which is formed partly in each of said layers of said block and tapers inwardly in all directions from its open end which is crosswise of said layers in a surface of said block to its closed end which is located within said block, a holder which supports said laminated block so that work parts may be readily inserted and removed from said recess located therein, and independent electrical connections for each of said electrically conductive layers of said block.

3. Resistance welding apparatus comprising a welding tip formed of a plurality of juxtaposed electrodes electrically insulated from one another and having complementary surface portions constituting the surface of a conoidal recess which extends into said welding tip from a surface thereof in which its open end is located, a holder which supports said welding tip so that work parts may be readily inserted and removed from said recess therein, and independent electrical connections for each of said electrodes of said welding tip.

4. Resistance welding apparatus comprising a welding tip formed of a plurality of juxtaposed electrodes electrically insulated from one another and having complementary surface portions constituting the surface of a conoidal recess which extends into said welding tip from a surface thereof in which its open end is located, a clamp having electrically conductive jaws each of which is adapted to make an electrically conductive engagement with one of said electrodes of said welding tip when said clamp is closed to hold said welding tip, a support which electrically insulates said clamp and exposes said welding tip so that work parts may be readily inserted and removed from said recess therein, and independent electrical connections for each of said electrodes of said welding tip.

5. A resistance welding tool comprising a laminated block formed of two electrodes of high resistance material separated by a strip of insulating material and having a recess therein which is formed partly in each of said electrodes and said strip of insulating material and which converges inwardly in all directions from its open end located crosswise of said electrodes and said strip in one end of said block to its closed end which is located within said block, a clamp having electrically conductive jaws each of which is adapted to make an electrically conductive engagement with an exposed side surface of one of said electrodes of said welding tip when said clamp is closed to hold said welding tip, a support which electrically insulates said clamp and exposes the recessed end of said welding tip so that work parts may be readily inserted and removed from said recess, and independent electrical connections for each of said electrodes of said welding tip.

6. A resistance welding tool comprising a laminated block formed of two electrodes of high resistance material separated by a strip of insulating material and having a recess therein which is formed partly in each of said electrodes and said strip of insulating material and which converges inwardly in all directions from its open end located crosswise of said electrodes and said strip in one end of said block to its closed end which is located within said block, a clamp having two electrically conductive jaws which are electrically insulated from one another and each of which is adapted to make an electrically conductive engagement with the side of one of said electrodes of said block, a sleeve of insulating material surrounding said clamp which is positioned therein so that the recessed end of said block is located at one end of said sleeve, a handle located at the other end of said sleeve for supporting said clamp, and an independent electrical connection for attaching to each of said jaws of said clamp a conductor which extends through said handle.

HEBER L. NEWELL.